Dec. 4, 1956  E. B. OFFUTT ET AL  2,773,237
DIRECT READING SYSTEM FOR METAL ION DETERMINATION
Filed May 31, 1950  3 Sheets-Sheet 1

FIG. I

INVENTORS:
ELMER BRADLEY OFFUTT
LEONARD V. SORG

BY Everett G. Johnson
ATTORNEY

Dec. 4, 1956   E. B. OFFUTT ET AL   2,773,237
DIRECT READING SYSTEM FOR METAL ION DETERMINATION
Filed May 31, 1950   3 Sheets-Sheet 3

INVENTORS:
ELMER BRADLEY OFFUTT
LEONARD V. SORG
BY: Everett A. Johnson
ATTORNEY.

United States Patent Office 2,773,237
Patented Dec. 4, 1956

2,773,237

DIRECT READING SYSTEM FOR METAL ION DETERMINATION

Elmer Bradley Offutt and Leonard V. Sorg, Kansas City, Mo., assignors to Standard Oil Company, Chicago, Ill., a corporation of Indiana Application May 31, 1950, Serial No. 165,164

3 Claims. (Cl. 324—31)

The present invention relates to apparatus and method for the electrochemical analysis of solutions. More specifically, our invention relates to methods and apparatus for qualitative and/or quantitative electrochemical or electrolytical analyses of liquids or solutions, organic or inorganic. Still more specifically, our invention relates to methods and apparatus employing a dropping mercury electrode for rapidly indicating concentrations of known metal ions such as derived from lead tetraethyl in gasoline by acid extraction.

It has long been known that an electrolytic solution permits the flow of current and at a definite voltage a characteristic electrode reaction occurs for the particular metal in the solution. The voltage at which this reaction occurs is an identifying voltage. If a voltage less than the identifying voltage is applied between electrodes immersed in a solution of that substance, substantially no current flows. On the other hand, if a voltage at least equal to the particular potential is applied, the magnitude of the electrolyzing current is proportional to the concentration of the metal in the test solution. It follows, therefore, that when in increasing voltage is applied between electrodes immersed in a solution of several metal ions no appreciable current will pass until the lowest critical potential is reached. When this value is attained, a current proportional to the concentration of the corresponding substance will flow; when the next higher identifying potential is reached abrupt increase in current occurs which is proportional to the concentration of the second substance. The determination of such a current-voltage curve thus amounts to qualitative and quantitative analysis of the test solution. This general type of system, although very useful for analytical purposes is not readily adaptable to rapid and frequent determinations as required for control purposes.

Polarographic analytical procedures have been proposed heretofore for the determination of lead in gasoline. However, in all such prior systems a polarogram of the solution is prepared by either manual or automatic plotting of the relationship between the voltage and diffusion current that results from the presence of the lead ion in the test solution into which a dropping mercury electrode has been placed. The subsequent measurement of the lead ion diffusion current was converted to an equivalent value of tetraethyllead by reference to a previously prepared standard calibration curve or chart. Such a polarographic technique requires relatively complicated and expensive equipment and is not readily adapted to routine analysis.

An object of the invention is therefore to provide an improved method and apparatus particularly adapted for rapid and routine analysis of metals in solution. A further object of the invention is to provide a novel method for making measurements of this type wherein the metal is known and it is desired to make a quantitative analysis.

Another object of our invention is to provide an apparatus and method for the analysis of solutions which utilizes in part the general principles of polarographic analysis but which does not have the disadvantages which are inherent in the plotting and use of a polarogram. Another object of our invention is to provide an instrument for the rapid determination and visual indication of the current-voltage relationships in the electrolytic systems under test. It is a further object of our invention to provide a system which is not susceptible to change in dropping rate of mercury from the electrode; or dilution, acidity, or temperature changes of the test solution within normally encountered ranges. Another object is to provide a system employing a pilot ion which permits reading concentrations of the unkwown metal directly and free from influence of dropping rate, dilution, acidity and temperature changes. A further object is to provide a system which avoids errors encountered in plotting and reading conventional polarograms and in making arithmetical calculations. A more specific object is to provide a method and means for the determination of concentration of tetraethyllead in gasoline without calculations and plotting or graphs or charts. These and other objects will become apparent as the description proceeds.

To attain these and other objects, our invention provides a unique direct reading polarographic instrument and a rapid method for the determination of tetraethyllead in gasoline without calculations or reference to graphs or charts. Tetraethyllead is decomposed by the hydrochloric acid treatment of a leaded gasoline and the resultant lead chloride in a test solution is analyzed by means of current measurements in a polarographic cell containing a dropping mercury electrode. The result is obtained by the use of a plurailty of voltage divider circuits, adapted to impress a series of successively increased voltages across the test solution in the cell containing the dropping mercury electrode.

The dropping mercury electrode comprises a glass tube having a very fine capillary through which mercury passes downwardly under a head of mercury in a reservoir above the capillary. The diameter and length of the capillary tube are such that the mercury is discharged from the open end at a slow rate. The delivery end of the tube is immersed in the solution undergoing analysis and the drops of mercury which form at the end of the capillary comprise the cathode of a cell; a pool of mercury collected below the capillary comprises the anode of the test cell. Voltages are applied to the cell from a battery or other suitable source of potential through a plurality of voltage dividing circuits. The currents flowing through the cell are balanced out in a bridge network, the last such network being actuated by a direct reading dial calibrated in milliliters of tetraethyllead in gasoline.

In view of the specific nature of the lead solution, we have discovered that we can measure the quantity of lead directly by adding to the test solution a known quantity of a metal ion having a half wave potential below that of lead, e. g. an antimony ion. Although the antimony ion is preferred, we may use other metal ions as a pilot ion if the half wave potential of the metal is at least 0.2 volt below lead. For example, we may use soluble compounds of bismuth, arsenic, copper and the like. The added metal ion serves as a reference or pilot ion and by our invention the lead content of the acid extract from the gasoline is determined with reference to this pilot ion.

The analytical results are obtained after applying a series of successively increased voltages across the test cell and are read directly from a double scale dial calibrated for two ranges of 0 to 4 and 4 to 8 ml. tetraethyllead per gallon of gasoline. Our improved method and apparatus will be described hereinafter with reference to a specific embodiment of apparatus and a particular pilot ion.

In the drawings the invention includes the arrangement of apparatus described in connection therewith where corresponding elements are identified by similar reference characters and wherein.

Figure 1:
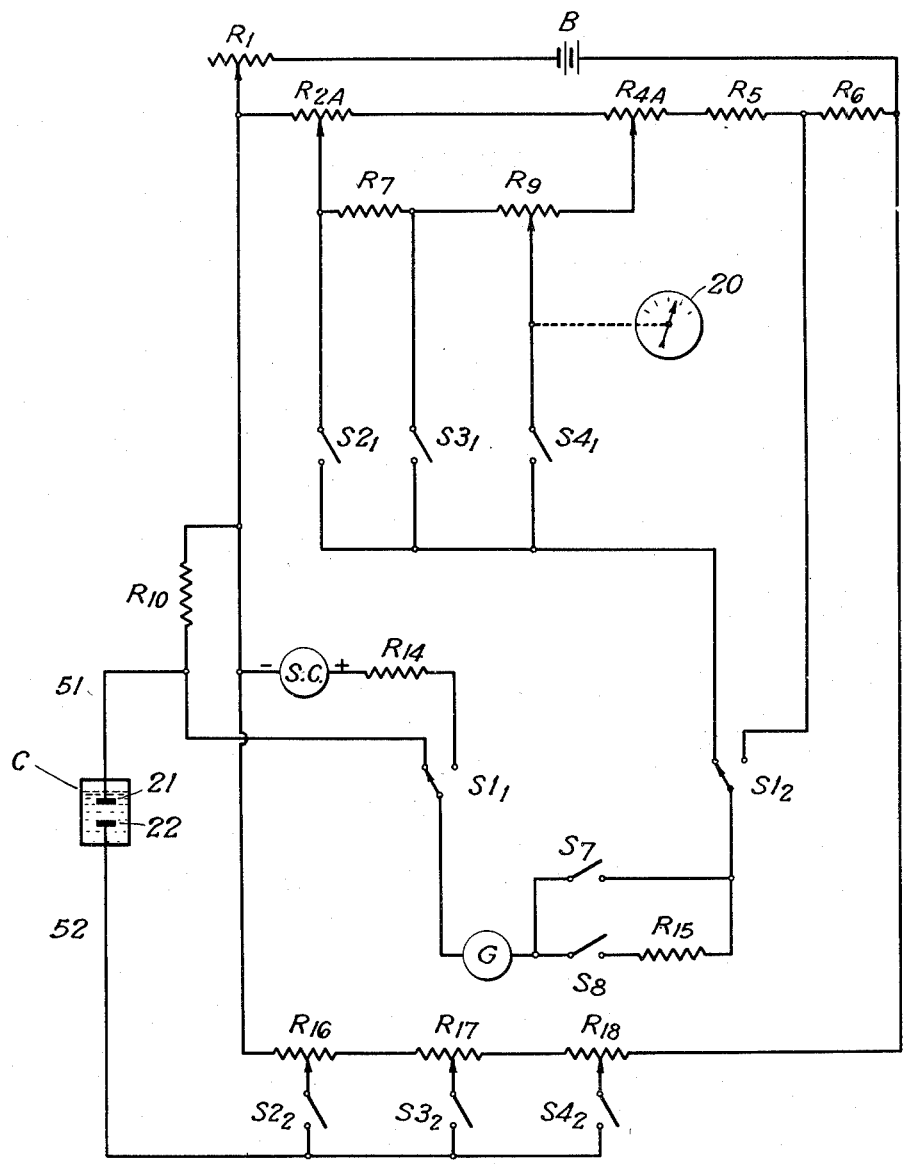
Figure 1 is a schematic wiring diagram of our apparatus illustrating the electrical principles employed.

Referring to the simplified wiring diagram shown in Figure 1, C is a measuring cell assembly connected in a circuit including a potential divided network composed of electrical potentiometers $R_{16}$, $R_{17}$, and $R_{18}$. The current through this network from battery B is controlled by rheostat $R_1$. The voltage supplied by each of the potentiometers $R_{16}$, $R_{17}$ and $R_{18}$ is adjusted by taking taps at potentials of between about 0.05 and about 0.1 volt on potentiometer $R_{16}$, between about 0.25 and about 0.4 volt on potentiometer $R_{17}$, and between 0.6 and 0.8 volt on potentiometer $R_{18}$.

Figure 3:
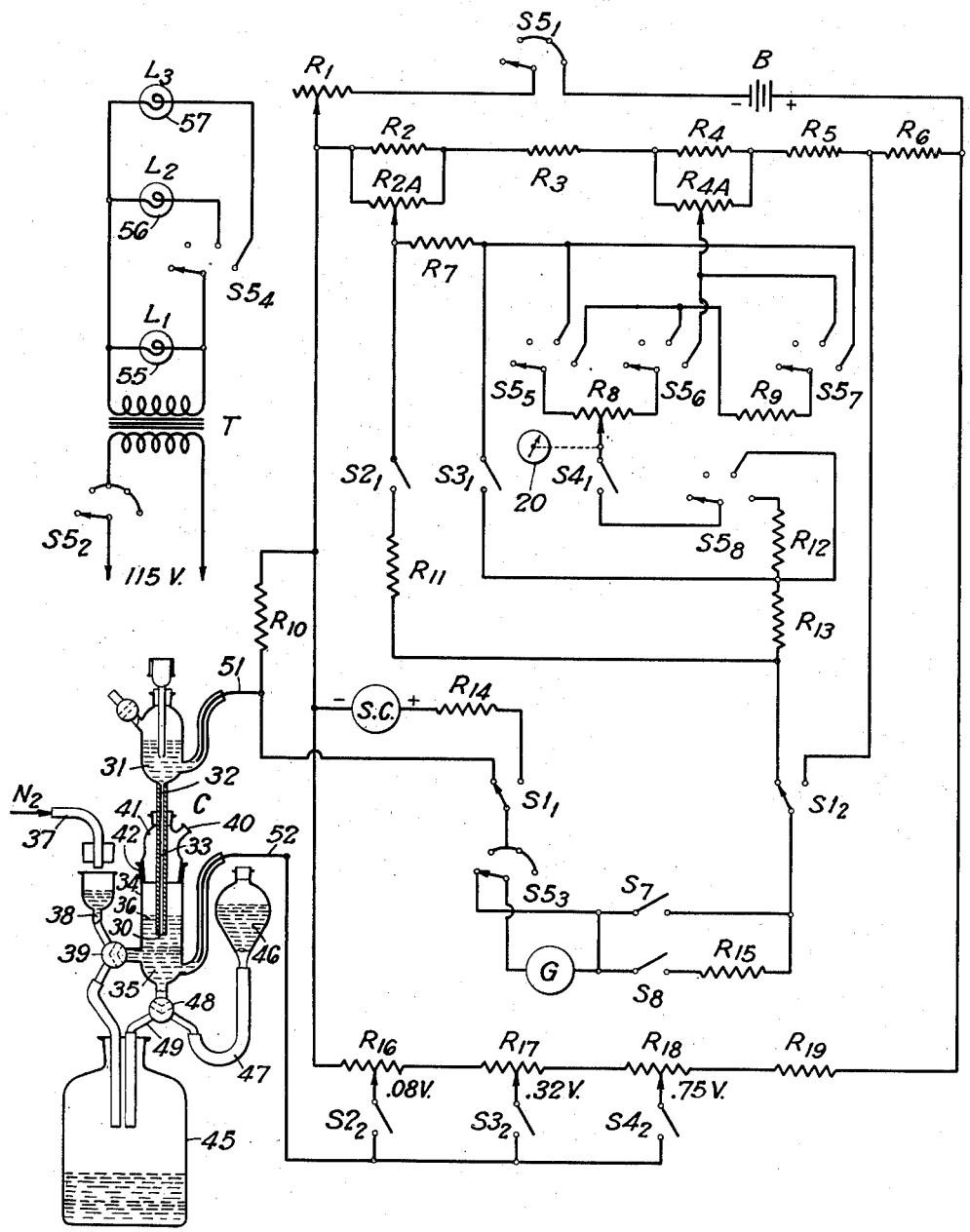
Figure 3 is a more detailed schematic representation of a preferred form of our apparatus.

Switches S2, S3 and S4, mounted in a single assembly together with S1, are each double-pole, single-throw in function, consisting of $S2_1$ and $S2_2$; $S3_1$ and $S3_2$; and $S4_1$ and $S4_2$ respectively, and by means of these switches, in addition to other functions, the selected potentials may in turn be applied across the electrodes forming a part of the measuring cell assembly C. As a selected potential is applied to the measuring cell C containing the solution of metal ions prepared as described herein, an electrical current flows through the cell which causes a proportional potential drop across resistor $R_{10}$ which is in series with the cell C. This potential drop across $R_{10}$ is measured by the network composed of potentiometer $R_{2A}$, potentiometer $R_{4A}$, resistor $R_5$ and resistor $R_6$ and the associated sub-network including resistor $R_7$ and potentiometer $R_9$. The control of potentiometer $R_9$ is used to actuate a calibrated instrument dial 20. If desired a fixed resistor may be used in conjunction with potentiometer $R_9$ as illustrated in Figure 3.

The $R_{2A}$—$R_{4A}$—$R_5$—$R_6$ network serves two functions: one for standardization of voltages and the other having to do with measuring the lead concentration in the solution. For the first function when switch S1 (a double-pole, double-throw push-button operated switch mounted in an assembly with S2, S3 and S4) is closed to the right, the galvanometer G is connected in series with a standard voltage reference which may be a standard cell SC, and these two components of the circuit are connected across a selected portion of the $R_{2A}$—$R_{4A}$—$R_5$—$R_6$ network. The galvanometer circuit includes resistors $R_{14}$ and $R_{15}$ which are selected to govern the galvanometer sensitivity in the various functions. Adjusting the rheostat $R_1$ to obtain a null reading on the galvanometer equalizes the potential drops not only across the $R_{2A}$—$R_{4A}$—$R_5$—$R_6$ network, but also across the potentiometer network $R_{16}$—$R_{17}$—$R_{18}$.

Pushing switch S2 automatically closes S1 to the left, and closes S2, applying a first potential to the measuring cell C and at the same time switch S1 is actuated, connecting the galvanometer G so that a portion of potentiometer $R_{2A}$ may be selected to be equal to the average potential drop across resistor $R_{10}$ due to the residual current. This balance is accomplished by adjusting $R_{2A}$ so that galvanometer swings equally to each side of zero, which is considered to be the null condition. The switch S3 is then closed releasing switch S2 and applying a second potential to the measuring cell and simultaneously connecting the galvanometer G between the positive end of resistor $R_{10}$ and the positive end of resistor $R_7$. The potential drop across the previously selected portion of $R_{2A}$ plus the drop across $R_7$ is made equal to the average potential drop across $R_{10}$ now due to the residual current plus antimony ion diffusion current in cell C. This equalization or balance is obtained by adjusting potentiometer $R_{4A}$. Finally a third potential is applied by closing push button switch S4, releasing S3, and connecting the galvanometer G to the slider of potentiometer $R_9$. The sum of potential drops across the previously selected portions of $R_{2A}$ plus that across resistor $R_7$ and a portion of $R_9$ is made equal to the drop across $R_{10}$, the drop across $R_{10}$ being due to the residual current plus diffusion current from both antimony and lead ions in cell C. The portion of $R_9$, proportional to that part of the voltage drop across $R_{10}$ due to lead ions, is obtained by adjusting the slider on $R_9$, which slider is followed by a dial 20 calibrated in milliliters of lead tetraethyl per gallon of gasoline.

Figure 2:
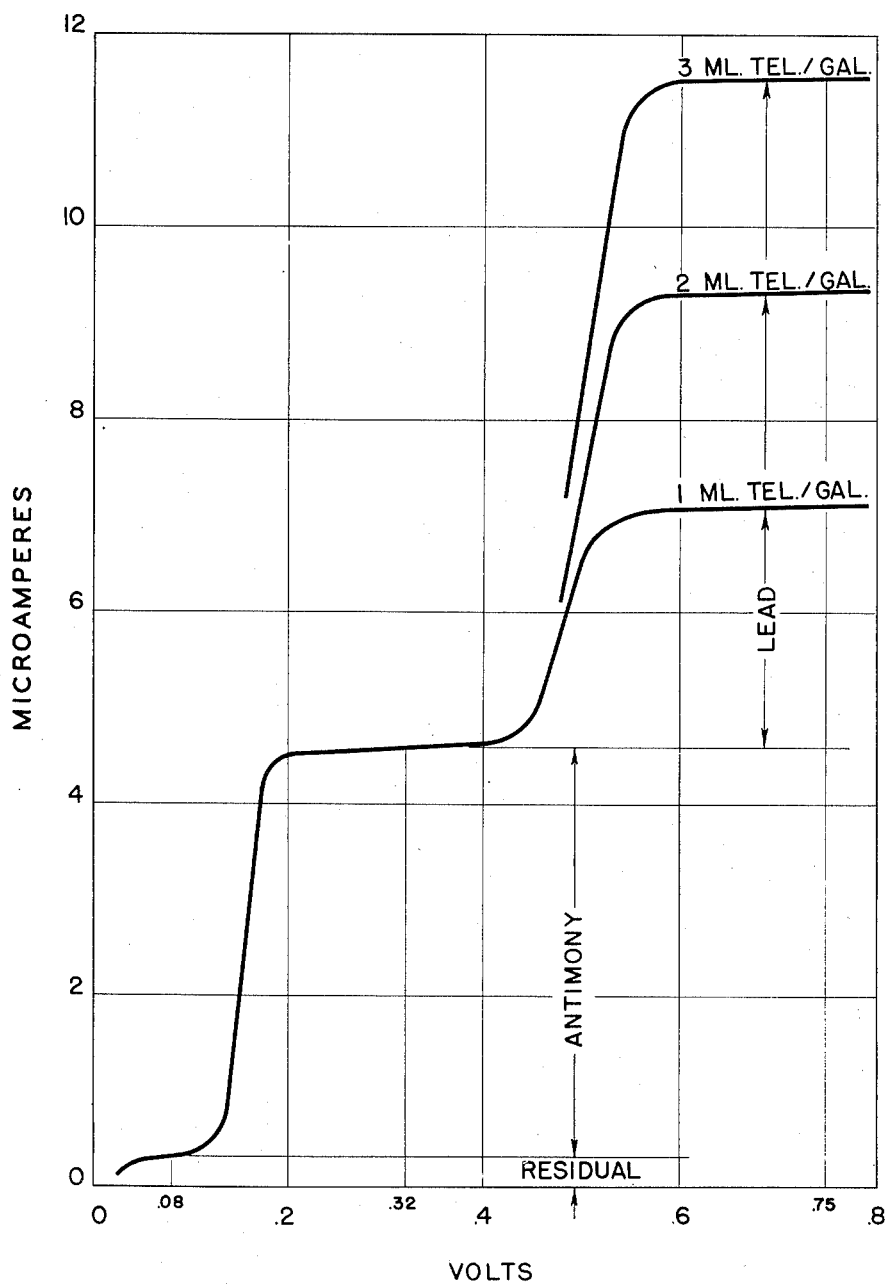
Figure 2 is a diagrammatic representation of the current-voltage relationships which exist and make feasible the apparatus illustrated in Figures 1 and 3 when employing a pilot ion.

In Figure 2, we have shown a set of curves illustrating the characteristic relationship between voltage applied to a test cell, containing a solution and a dropping mercury electrode, and the resulting diffusion current due to antimony and due to three different concentrations of lead equivalent to 1, 2 and 3 ml. of tetraethyllead per gallon of gasoline. The voltage values are those impressed across the dropping mercury electrode and a quiet mercury pool with hydrochloric acid as a supporting electrolyte. According to our invention, diffusion currents are not actually measured but rather the magnitude of the current due to lead ions is compared with the current due to antimony ions. The current indicated with the application of 0.08 volt is the residual current due to the supporting electrolyte. The amount of antimony added to any test solution is uniform and the resultant antimony ions serve as pilot ions to which the lead may be referred as an indication of concentration. The current increase obtained by increasing the voltage to 0.32 volt is due to the added antimony ions and the current increase obtained by impressing a voltage of 0.75 volt is due to lead ions. In our invention, by comparing the diffusion current due to the lead ions with that known to be due to antimony, variations in the readings which result in ordinary apparatus from moderate differences in the mercury dropping rate, the cell temperature, the acidity of the test solution, and the extent of dilution of the solution are nullified as between successive analyses.

Referring to Figure 3 of the drawing, the measuring cell assembly C includes a dropping mercury electrode 30 which may be of glass. An upper portion of the assembly comprises a mercury reservoir 31 attached by a rigid or flexible tube 32 to a mercury dropping capillary 33. The capillary 33 extends into the measuring cell chamber 34 which contains a quiet mercury pool electrode 35 and the solution 36 to be analyzed. The mercury dropping rate is controlled by the length and bore of the capillary 33 and the head on the mercury in the reservoir 31. A mercury dropping rate of about 15 drops per minute has been found satisfactory. The capillary 33 is adjusted within the cell 34 so that the lower end thereof is immersed within the solution to be analyzed and is approximately one-quarter inch above the surface of the mercury pool 35.

Preliminary to making a test, a cell is purged with oxygen-free nitrogen introduced by conduit 37 and line 38 for three to five minutes at a rate of about 200–250 ml. per minute to remove oxygen from the solution. In such a purging operation, the stopcock 39 is adjusted to direct the flow into the cell and the purge gas is vented through tap 40 in the upper half of cell 41 connected to the lower half 34 by spherical joint 42. Waste bottle 45 is provided for accumulating the used mercury and spent solution from the test cell and a movable reservoir 46 connected by flexible conduit 47 to stopcock 48 is used to adjust the level of the mercury pool in the cell 34. The stopcock 48 permits drainage of the cell 34 through line 49 into the waste bottle 45.

Electrical leads 51 and 52 are connected to the measuring cell electrodes 30 and 35. The above elements comprise the external portion of the apparatus and the balance of the schematically represented apparatus is housed within a portable case.

Referring to the preferred electrical system illustrated schematically in Figure 3, S5 designates a group of switches assembled in a gang having four positions and connected into eight circuits. The positions of S5 are (1) off; (2) standardize; (3) measure 0–4 ml. range, (4) measure 4–8 ml. range. The switches S1, S2, S3 and S4 are mounted in a push-button switch assembly and are individually operated by a latching inter-releasing push-button mechanism. Depressing one of the buttons controlling these switches latches the button and automatically releases any other button that may have been previously in the latched position. One such switch which is commercially available is a multiple push-button switch, each button having double-pole and double-throw. This type of switch is described in detail and is the subject matter of Hall et al. Patent 2,234,405.

The instrument circuit contains three voltage-divider networks, one consisting of two-ohm wire-wound resistor $R_2$, two-ohm wire-wound potentiometer control $R_{2A}$, 5-ohm wire-wound resistor $R_3$, 25-ohm wire-wound resistor $R_4$, 25-ohm wire-wound potentiometer control $R_{4A}$, wire-wound resistor $R_5$ having a value in ohms which equals $$101.9 - \left[ \frac{R_2 \times R_{2A}}{R_2 + R_{2A}} + R_3 + \frac{R_4 \times R_{4A}}{R_4 + R_{4A}} \right]$$

and 3.15-ohm wire-wound resistor $R_6$.

Another voltage-divider network consists of 746-ohm wire-wound precision resistor $R_7$, 1960-ohm potentiometer $R_8$ and 1906-ohm resistor $R_9$. A third voltage-divider network consists of two 300-ohm wire-wound potentiometer controls $R_{16}$ and $R_{17}$, a 400-ohm wire-wound potentiometer control $R_{18}$, and a 400-ohm wire-wound resistor $R_{19}$. Voltages across the networks described above are standardized for each determination by balancing the voltage of a Weston standard cell (1.019 volts) SC with the voltage drop across a portion of the $R_2$—$R_6$ network by adjusting the current from battery B with the 100-ohm wire-wound rheostat control $R_1$. The battery B produces 1.5 volts and may comprise two #6 dry cells connected in parallel.

For lead and antimony tests, taps are taken on the resistors in the $R_{16-19}$ network at 0.08, 0.32, and 0.75 volt. By means of switches $S2_2$, $S3_2$ and $S4_2$ these potentials may be applied successively across the electrodes 30 and 35.

As a potential is applied to the electrodes bridged by a test solution 36 to which a pilot ion has been added as described herein, an electrical current flows through the cell via the dropping mercury electrode 30 and the mercury pool electrode 35, thereby causing a proportional voltage drop across 5000-ohm wire-wound precision resistor $R_{10}$ in series with the cell. This voltage drop, which fluctuates in a regular manner because of the formation of mercury drops at the tip of the capillary 33, is measured by the $R_7$—$R_8$—$R_9$ network. The current through this network is adjusted by the positions of the sliders on the potentiometer controls $R_{2A}$ and $R_{4A}$. To make the adjustments, switch S2 is closed, thereby applying 0.08 volt to the dropping mercury electrode 30. The average voltage across the precision resistor $R_{10}$, due to the measuring cell residual current, is balanced by adjusting the potentiometer $R_{2A}$, so that the galvanometer G, connected in the circuit by switch S2, swings equally to each side of zero, which is considered to be the null condition. When push button switch S3 is depressed to apply 0.32 volt, the average voltage across the 5000 ohm resistor $R_{10}$, due now to the residual current plus the antimony ion diffusion current, is balanced with the voltage drop across resistor $R_7$ by adjusting the potentiometer $R_{4A}$. Thus the current through the $R_7$—$R_8$—$R_9$ network becomes solely a function of the antimony ion diffusion current.

Closing switch S4 applies 0.75 volt and the voltage drop across resistor $R_{10}$ is now due to the residual current plus the diffusion current due to both antimony and lead ions in the test solution 36. This voltage is balanced by adjusting the potentiometer $R_8$ and the relative position of the slider on the potentiometer $R_8$ is indicated by a calibrated dial 20, which is graduated in ml. of tetraethyllead per gallon of gasoline.

The relationship between the resistor $R_7$, the potentiometer $R_8$ and the resistor $R_9$ is adjusted as part of the original instrument calibration. Following the final adjustment in a measurement, the following mathematical ratios are equal:

For the 0–4 ml. range, $$\frac{\text{Selected portion of potentiometer } R_8}{\text{Resistor } R_7} =$$

$$\frac{\text{Lead-ion diffusion current}}{\text{Antimony-ion diffusion current}}$$

For the 4–8 ml. range, $$\frac{\text{Resistor } R_9 + \text{selected portion } R_8}{\text{Resistor } R_7} =$$

$$\frac{\text{Lead-ion diffusion current}}{\text{Antimony-ion diffusion current}}$$

The galvanometer G may be, for example, of the type having 0.02 microamps per division and having an 1100 ohm coil resistance and is connected to the appropriate points in the circuit by the action of switch S5 and the various push button switches S1, S2, S3 and S4 to serve as a null balance indicator. The resistors $R_{11}$, $R_{12}$, $R_{13}$, $R_{14}$, $R_{15}$ govern the effective galvanometer sensitivity in the different measurements and for these various functions the resistances in the circuit indicated in the schematic diagram may be metallized resistors having the following values: $R_{11}$, 5000 ohms; $R_{12}$, 75,000 ohms; $R_{13}$, 33,000 ohms; $R_{14}$, 273,000 ohms; and $R_{15}$, 47,000 ohms.

The transformer T, adapted for 60 cycle A. C. and transforming from 115 volts to 6 volts, supplies current for the galvanometer scale lamp 55 and dial lamp 56 illuminating the 0–4 ml. tetraethyllead per gallon range scale and dial lamp 57 illuminating the 4–8 ml. range scale on the dial 20.

Calibration of our device is carried out by means of a standard solution and the instrument may, for example, be calibrated at points corresponding to 0.5, 1.0, 2.0, 3.0, 4.0, 6.0 and 8.0 ml. of tetraethyllead per gallon of gasoline. The standard lead solution consists of 1.875 grams of CP lead chloride dissolved in distilled water and diluted to 1000 ml. 10 ml. of the solution are equivalent to the lead contained in 50 ml. of gasoline having one ml. of tetraethyllead per gallon. A portion of the solution equivalent to the desired concentration of tetraethyllead per gallon is admixed with 25 ml. of concentrated hydrochloride acid, 5.0 ml. of pilot ion solution, and 5 ml. of maxima suppressor. The pilot ion solution may, for example, consist of about 0.03 mol of antimony tetrachloride and 200 ml. of concentrated hydrochloric acid in 1000 ml. of solution. The maxima suppressor solution may consist of about one gram of methylene blue dissolved in 1000 ml. of distilled water. The hydrochloric acid used has a specific gravity of 1.8–1.9.

The mixture is diluted to 250 ml. and a portion of the solution, e. g. 10–15 ml. of final solution, is placed in the cell chamber 34 for making the polarographic measurement. Oxygen is purged from the test solution with nitrogen. After the electrical leads 51 and 52 are connected to the measuring cell electrodes, power is supplied to the instrument and the galvanometer G is checked for zero. A fixed pattern of operations, involving the successive impression of the three voltages, is followed in each case by adjustment of the associated potentiometers to produce an average zero on the galvanometer G. Following the final adjustment, the dial 20, controlled by slider on the potentiometer $R_8$, is marked for the equivalent concentration of tetraethyllead per gallon. This procedure is followed in establishing each of the selected calibration points.

In making an analysis of a leaded gasoline, the tetraethyllead is a sample of gasoline equivalent to 50 ml. at 60° F. is decomposed with hydrochloric acid and extracted in accordance with method D 526–48T described in A. S. T. M. Standards on Petroleum Products and Lubricants, pages 293–295 (1948). To measure the gasoline sample, a pipette is used to deliver the equivalent of 50 ml. of gasoline at 60° F. for actual temperatures differing from 60° F., the stem of the pipette carrying a special scale graduated from 15.6 to 35° C. 5 ml. of the standard antimony pilot ion solution and 5 ml. of maxima suppressor solution are introduced into the combined acid and aqueous extract contained in a 250 ml. graduated glass stoppered cylinder.

Distilled water is added to the cylinder to make a total solution of about 250 ml. which is thoroughly mixed. 10 to 15 ml. of this final solution are transferred to the measuring cell above the mercury pool therein. Oxygen is purged from the solution by bubbling oxygen-free nitrogen through the solution. The series of progressively increasing potentials is then applied across the electrodes in the test cell as described above.

A fixed pattern of operations is performed involving the successive impression of the three voltages, followed in each case by adjustment of the associated potentiometer to produce a null condition as indicated by the galvanometer G. The last such adjustment by the potentiometer linked with the calibrated dial 20 yields the final result of ml. of tetraethyllead per gallon of the gasoline.

In order to obtain a measure of the accuracy of the over-all method including tetraethlylead decomposition and extraction, and the subsequent polarographic measurement by our novel method and apparatus, a series of test samples was prepared for analyses. These samples were made up by the addition of known amounts of tetraethyllead to "isooctane" (2,2,4-trimethyl pentane) to cover the range of 0.5 to about 8 ml. of tetraethyllead per gallon. The data obtained indicate that the over-all accuracy of our polarographic method is very good.

To compare the repeatability of our polarographic method with that of the A. S. T. M. method for actual gasoline analysis, complete triplicate analyses of a number of different gasoline samples were performed by both methods. The data from the comparative analyses show that the polarographic method is in excellent agreement with the A. S. T. M. method, the deviation being within the probable accuracy of the two methods.

From the above it will be apparent that we have obtained objects of our invention and although it has been described with reference to specific embodiments, it should be understood that this is by way of illustration only, and that our invention is not limited thereto. Furthermore, in view of the description given, modifications will become apparent to those skilled in the art and such modifications and alternatives come within the scope of the invention described and defined by the appended claims.

What we claim is:

1. An apparatus for determining the proportion of lead ions in an unknown solution by maintaining in said solution a known proportion of antimony ions and impressing stepwise a plurality of distinguishable potentials which comprises in combination a test cell including a dropping mercury electrode, a mercury pool electrode, a first conductor connected to said dropping mercury electrode and a second conductor connected to said mercury pool electrode, a source of potential, a circuit including said test cell, a plurality of individually controlled dividers of the potential from said source, a plurality of gang switches, a plurality of voltage balancing means in said circuit selectively controlled by said gang switches, a means in said circuit adapted to indicate electrical balance and unbalance of said circuit, said voltage balancing means including potentiometer means associated with each of said potential dividers for balancing the circuit and thereby measuring the electrical current passing through said test cell, and switch means for selectively impressing potentials from said potential dividers of about 0.05 to 0.1 volt, about 0.25 to 0.4 volt, and about 0.6 to 0.8 volt across said electrodes.

2. An apparatus for directly reading the amount of a known metal ion in an unknown solution by maintaining in said solution a known proportion of a selected pilot metal ion having a half wave potential which differs from said known metal ion by at least 0.2 volt and impressing stepwise a plurality of distinguishable potentials which comprises in combination a test cell including a dropping mercury electrode, a mercury pool electrode, a first conductor conected to said dropping mercury electrode and a second conductor connected to said mercury pool electrode, a source of potential, a circuit including said test cell, a plurality of individually controlled dividers of the potential from said source, a plurality of gang switches, a plurality of voltage balancing means in said circuit selectively controlled by said gang switches, a means in said circuit adapted to indicate electrical balance and unbalance of said circuit, said voltage balancing means including potentiometer means associated with each of said potential dividers for balancing the circuit and thereby evaluating the electrical current passing through said test cell, and switch means for selectively impressing preselected potentials from said potential dividers.

3. An apparatus for directly reading the amount of a known metal ion in an aqueous solution by comparison with a standard amount of a selected pilot ion added to the said solution, the combination which comprises a test cell for segregating a measured quantity of solution containing the known ions for which the quantitative analysis is to be made, means for adding a standard amount of pilot ion to the solution under test, a dropping mercury electrode disposed within said cell, a mercury pool electrode within said cell, a resistive element having a first end and a second end in series with said electrodes, first electrical circuit means in series with said electrodes and said resistive element for applying three different potentials sequentially across said electrodes thereby causing an electric current to flow through said test cell and through said resistive element, a null electrical indicator having a first input and a second input, second electrical circuit means for applying to said first input of said null electrical indicator the potential developed at the said first end of said resistive element by the said three applied potentials, third electrical circuit means for generating and applying to the said second input of said null electrical indicator three potentials of the same polarity as the three potentials applied to the said first input thereof from said first end of said resistive element, said third electrical circuit means containing a first variable voltage source connected to the said second end of said resistive element, a second variable voltage source, and a voltage divider having a first end, a second end and an adjustable tap, the first end being connected to said first variable voltage source and the second end being connected to said second variable voltage source, said first variable voltage source being adjustable to vary the magnitude of the first of the three potentials generated in said third electrical circuit means to provide a null electrical condition at said null electrical indicator and whereby the potential applied to said first end of said voltage divider is proportional to the diffusion current flowing through said test cell resulting from the application to the test cell of the first of the potentials in said first electrical circuit means, said second variable voltage source in said third electrical circuit means being adjustable to vary the magnitude of the second of the three potentials generated in said third electrical circuit means to produce a null electrical condition at said null electrical indicator and whereby the potential applied to said second end of said voltage divider is proportional to the electric current flowing through said test cell resulting from the application to the test cell of the second of the three potentials of said first electrical circuit means, and means operatively connected to said adjustable tap on said voltage divider for directly reading the concentration of the known metal ion after said tap is adjusted to produce a null electrical condition at said null electrical indicator when the third of the said three potentials of said first electrical circuit means is applied to the said electrodes in said test cell.

References Cited in the file of this patent

UNITED STATES PATENTS

| | | |
|---|---|---|
| 2,099,349 | Rosebury | Nov. 16, 1937 |
| 2,188,830 | Clark et al. | Jan. 30, 1940 |
| 2,267,551 | Cherry | Dec. 23, 1941 |
| 2,361,295 | Kanner et al. | Oct. 24, 1944 |
| 2,370,871 | Marks | Mar. 6, 1945 |
| 2,563,062 | Perley | Aug. 7, 1951 |

OTHER REFERENCES

"Oil and Gas Journal," vol. 39, Sept. 26, 1940, pages 51 and 52, article by Fredianai et al.

"Industrial & Eng. Chem., Analytical Edition," vol. 15 (1943), pages 520 thru 523, article by Tyler et al.

"The Chemical Age," June 6, 1942, pages 279 and 280, article by Masters.

"Analytical Chemistry," vol. 21 (1949), pages 45 thru 48 of article by Lingane.

"Polarography," by Kolthoff et al., vol. 1, 2nd edition (1952), pages 297, 298.